3,285,737
NUCLEAR FUEL MATERIALS
Roy Graham Bellamy, Newbury, England, assignor to United Kingdom Atomic Energy Authority, London, England
No Drawing. Filed Dec. 10, 1964, Ser. No. 417,493
Claims priority, application Great Britain, Dec. 17, 1963, 49,729/63
7 Claims. (Cl. 75—122.7)

The present invention relates to uranium alloys.

It is known that when uranium is irradiated in a nuclear reactor the crystals grow along one crystal axis and contract along another. Consequently, if the uranium crystals in a bar of uranium, which is being used as a fuel element for example, have a preferred orientation the bar as a whole will grow and, if the increase is in length, it is possible that the containing can may be ruptured. Moreover, if the crystals are large, the growth will result in surface wrinkling even if the crystals have no preferred orientation and this is a further defect which must be avoided if possible. In order to prevent this overall growth or wrinkling, it is necsssary to arrange that the crystal structure is random and that the crystals themselves are small.

During the irradiation of the uranium, fission products are formed and certain of these products, notably xenon and krypton, are in the form of gas and therefore appear in the uranium as gas bubbles. If these bubbles are permitted to grow to a large extent they can cause swelling and even disruption of the uranium bar. However, if the same amount of gas is present as a very large number of very small bubbles as opposed to a smaller number of larger bubbles, no excessive swelling takes place.

It is therefore apparent that uranium, to be practicable as a reactor fuel material, requires "modifying" and British Patent 863,492 discloses a "modified" uranium, that is to say, an alloy of uranium with minor additions of iron (200 to 500 p.p.m.) and aluminium (500 to 1200 p.p.m.). It is disclosed in British Patent 863,492 that if this alloy is heat treated by being quenched from the $\beta$ phase region and subsequently annealed in the $\alpha$ range the properties of the material are much improved. We believe that the reason for this is that the iron forms an inter-metallic iron/uranium compound which is soluble in the $\beta$ phase but substantially insoluble in the $\alpha$ phase. The presence of this iron/uranium compound also appears to depress the $\beta$–$\alpha$ transformation temperature with the result that the density of nucleation is increased and smaller grains are formed. Moreover, when the uranium is heat treated as above described the iron/uranium compound precipitates and appears to inhibit further grain growth so that a random structure of small crystals is obtained.

We believe that the mechanism which reduces the degree of swelling is due to the presence of the aluminium which also forms an inter-metallic compound with uranium. This compound is slightly soluble in the $\beta$ range but has very limited solubility in the $\alpha$ range. Consequently, the above described heat treatment will also cause a precipitate of the aluminium/uranium compound, and we have discovered that this precipitate forms chiefly within the grains of uranium unlike the iron compound which precipitates chiefly at the grain boundaries. We believe that in addition to acting as an inhibitor to grain growth, this aluminium/uranium precipitate induces the formation of a large number of small fission gas bubbles as opposed to a smaller number of larger bubbles.

The object of the present invention is, therefore to provide a new or improved uranium alloy which may be heat treated and may thereafter be used as a nuclear fuel material in, for example, graphite or water moderated reactors even at high ratings or in fast reactors.

According to the present invention there is provided an alloy of uranium containing 100–1500 p.p.m. of aluminium and an addition of at least one grain refining element in a quantity sufficient to produce a grain size not exceeding 0.5 mm., the rest being uranium and incidental impurities.

In an alloy according to the present invention, swelling resistance is imparted by the aluminium content whilst the grain refining effect is caused mainly by the presence of the grain refining elements although the aluminium content will have some grain refining effect. The alloy is conveniently produced by melting the constituent metals in a graphite crucible and thus one of the major impurities present in the alloy will be carbon.

With aluminium contents in the range of 100–400 p.p.m. an increase in swelling resistance is to be observed as the aluminium content is increased. Increasing the aluminium content above 400 p.p.m. leads to no further appreciable increase in swelling resistance. If the aluminium content exceeds about 1500 p.p.m., precipitation of comparatively large particles of the intermetallic compound $UAl_2$ occurs and these particles may give rise to embrittlement of the material. Since it will be appreciated that such embrittlement is undesirable in a nuclear fuel material, it is therefore necessary to define the upper practical limit for aluminium content as being 1500 p.p.m.

Elements which, as the solute in a binary alloy with uranium, will refine the grain size of the uranium on $\beta$ quenching are, in approximate order of efficiency: chromium, molybdenum, rhodium, iridium, osmium, rhenium, ruthenium, nickel, cobalt, iron, silicon, niobium, platinum, tungsten, vanadium, manganese and aluminium.

Ternary alloys of uranium-iron-aluminium have been disclosed in the aforementioned British Patent No. 863,492 and thus the present application makes no claim to any iron-aluminium-uranium alloys.

A suitable grain refining element is silicon, the quantity required to produce the desired grain-refining effect being in the range 200–500 p.p.m. of silicon. However, British Patent 811,841 discloses a uranium alloy containing not less than 0.05 percent by weight (i.e., not less than 500 p.p.m.) of at least one element of the group consisting of aluminium, silicon, phosphorus, tin, lead, bismuth, niobium and zinc and thus the present invention makes no claim to alloys of uranium and aluminium with silicon or niobium falling within the claims of British Patent 811,841.

It will be appreciated that the choice of a grain-refining element for use according to the present invention will be dependent on the neutron absorbing properties of the particular element and thus it is desirable to define an upper limit of the grain-refining content in terms of its effect on neutron absorbing properties of the alloys. This limit may conveniently be defined as an alloying content which is insufficient to cause an increase in the neutron absorbing properties of the uranium by an amount exceeding 0.1 percent.

According to a preferred method of carrying the invention into effect, a magnesium reduced uranium billet is placed in a graphite crucible with the requisite quantity of aluminium in the form of a 3% master alloy of aluminium with uranium. The grain-refining element may be added in the form of a strip of the element, or alternatively, the element may be in the form of a master alloy with uranium. The contents of the graphite crucible are then melted by H.F. induction heating under vacuum and, whilst still under vacuum, the melt is poured into graphite steel moulds and allowed to cool to produce bars of one inch diameter and four feet length. These bars are fed vertically by guide rollers through an H.F. heating coil so that their surfaces reach a temperature of 720° C. (i.e., a temperature in the $\beta$-phase region) and then through a sheet of water which is caused to impinge all round the surface of each bar. To avoid "end effects" and consequent uneven heating, the bars are fed through the heating and quenching process in end contact with one another.

After quenching the bars, they are suspended freely from one end in argon under a slight pressure and maintained at 500° C. (i.e., in the α-phase region) for an hour to anneal the bar.

In a laboratory scale experiment an alloy was made up by heating together 500 gms. of uranium metal, 8.0 gms. of 3% aluminium master alloy and 0.25 gm. of chromium. Analysis of the product showed 500 p.p.m. aluminium and 500 p.p.m. chromium. This alloy was heat treated and then irradiated in a neutron flux of $6 \times 10^{13}$ n./cm.$^2$/sec. for 11 weeks to give a burn up corresponding to 4000 mwd/te. Dimensional change after irraddiation was less than 1.5% with a volume increase of less than 3.5%, a satisfactory alloy being one which under these condition suffers dimensional changes of less than 4% and volume increase of less than 15%.

The alloy of the present invention when formed into bars and heat treated in the manner described has the required fine grain size due to the grain refining content of the alloy and good swelling resistance due to the aluminium content of the alloy and thus such an alloy is suitable for use as a nuclear fuel material.

I claim:
1. An alloy of uranium containing 100–1500 p.p.m. of aluminium and a corresponding addition of at least one grain refining element to give a grain size not exceeding 0.5 mm., the rest being uranium and incidental impurities.
2. The alloy of claim 1 wherein the grain refining element is selected to be at least one of the group consisting of chromium, molybdenum, rhodium, cobalt, iridium, osmium, rhenium, ruthenium, nickel, platinum, tungsten, vanadium and manganese.
3. The alloy of claim 1 wherein the amount of grain refining element contained in the alloy is insufficient to increase the neutron absorbing properties of the alloy by more than 0.1 percent compared to the neutron absorbing properties of uranium.
4. The alloy of claim 1 when subjected to a quenching from the beta-phase and subsequent annealing in the alpha-phase.
5. An alloy of uranium containing 100–1500 p.p.m. of aluminium and 200–500 p.p.m. of silicon, the rest being uranium and incidental impurities.
6. An alloy of uranium containing 100–1500 p.p.m. of aluminium and 200 p.p.m. to 500 p.p.m. of niobium, the rest being uranium and incidental impurities.
7. A fuel element for a nuclear reactor comprising an alloy of uranium containing 100–1500 p.p.m. of aluminium and a corresponding addition of at least one grain refining element to give a grain size not exceeding 0.5 mm., the rest being uranium and incidental impurities.

References Cited by the Examiner

UNITED STATES PATENTS

| 3,010,890 | 11/1961 | Jepson et al. | 75—122.7 X |
| 3,170,788 | 2/1965 | Binstock et al. | 75—122.7 |
| 3,177,069 | 4/1965 | Englander et al. | 75—122.7 |

FOREIGN PATENTS 811,841  4/1959  Great Britain.

OTHER REFERENCES

Aubert et al.: Memoires Scientifiques, De La Revue Metallurgie, vol. 56, June-December 1959, pp. 393–402.

Nuclear Science Abstracts, vol. 16, No. 24 A, December 1962; Abstract No. 33380.

Nuclear Science Abstracts, vol. 17, No. 24, December 1963; Abstract No. 41468.

BENJAMIN R. PADGETT, *Primary Examiner.*

M. J. SCOLNICK, *Assistant Examiner.*